United States Patent [19]
Meinke et al.

[11] 3,988,658
[45] Oct. 26, 1976

[54] ELECTROMAGNETIC DRIVE ASSEMBLY FOR ROTARY BODIES USING A MAGNETICALLY MOUNTED ROTOR

[75] Inventors: Peter Meinke, Grossinzemoos; Gerhard Flachenecker, Ottobrunn, both of Germany

[73] Assignee: Maschinenfabrik Augsburg-Nurnberg AG, Germany

[22] Filed: July 29, 1974

[21] Appl. No.: 492,712

[30] Foreign Application Priority Data
July 27, 1973 Germany.............................. 2338307

[52] U.S. Cl................................. 318/647; 318/653; 318/676; 308/10; 310/12; 74/5.46
[51] Int. Cl.² ....................... G05F 1/00; F16C 39/06
[58] Field of Search.................... 318/676, 647, 653; 308/10; 310/12, 163; 74/5.46

[56] References Cited
UNITED STATES PATENTS

| | | |
|---|---|---|
| 3,243,238 | 3/1966 | Lyman ................................. 308/10 |
| 3,462,666 | 8/1969 | Martinek ............................... 308/10 |
| 3,480,811 | 11/1969 | Grosbard .............................. 308/10 |
| 3,548,275 | 12/1970 | Inggaki et al. ................... 318/376 X |
| 3,694,041 | 9/1972 | Studer................................... 308/10 |
| 3,845,995 | 11/1974 | Wehde.................................. 308/10 |

*Primary Examiner*—Robert K. Schaefer
*Assistant Examiner*—John J. Feldhaus
*Attorney, Agent, or Firm*—Craig & Antonelli

[57] ABSTRACT

An electromagnetic drive for rotary bodies including a stationary member having at least two coils and a revolving member arranged for rotation with respect thereto. The coils are supplied with a current signal for causing rotation of the revolving member and a sensing arrangement senses the position of the revolving member with respect to the stationary member and provides an output indicative thereof. A control device is responsive to the output of sensing arrangement for supplying an additional current signal to the coils effect positional control of the revolving member.

35 Claims, 7 Drawing Figures

ELECTROMAGNETIC DRIVE ASSEMBLY FOR ROTARY BODIES USING A MAGNETICALLY MOUNTED ROTOR

The present invention relates to an electromagnetic drive for rotary bodies including a stationary member having at least two coils and a revolving member of a magnetizable material.

Rapidly spinning rotary bodies requiring magnetic bearing provisions for the reason that mechanical or other bearings would pose difficulties in their particular field of application generally exhibit in each bearing plane a set of annular of other coils which utilize magnetic forces to restore the rotary body to its intended position and dampen it. In addition to these active bearings, a set of coils is still needed to provide the rotating field for the drive. This arrangement is expensive and requires considerably available space, where the latter disadvantage makes itself felt especially in the case of airborne gyroscopes or of pumps supported without the aid of mechanical contact in the interior of pipe lines. Inasmuch as active magnetic bearings, unlike e.g. journal bearings, cannot centrally locate a part, the air gaps in the drive outside the bearing planes must necessarily have large tolerances and, thus, are inefficient. Conditions are much the same in the case of long, drooping shafts which likewise require generously toleranced air gaps in the drive motor.

In a broad aspect, the present invention provides a bearing arrangement which generally makes it possible to reduce the air gap in the drive motor and promote its efficiency and which, more particularly, simplifies active bearings for driven rotary bodies, reduces their size and economizes their cost.

It is an object of the present invention to provide a bearing arrangement where apart from the energization of the coils for driving purposes, the coils or portions of their windings are also energized by a control means communicating with a test system sensing the radial position of the rotary body.

In this arrangement, the set of coils normally needed for drive purposes is employed and there is superimposed on the driving currents, control currents from a control means such that the coils not only supply the drive torque, but also provide the magnetic forces to act on the rotary body as needed to correct its position. Inasmuch as the present invention eliminates the need for at least one set of coils and, more particularly, for that set which previously served the sole function of correcting the position of the rotary body, the present invention provides an improvement to the present state of the art in terms of economy in space and cost. A further advantage is in that the bearing, which represents the point of minimum radial deflection, acts in exactly the plane of drive, and this make it possible to minimize the air gaps in the drive proper without the risk of the revolving member of the drive rubbing against the stationary member. A still further benefit is that the heat effect from both the drive and the positional control of the bearing acts on a common point of the rotary member, which makes it easier to control the supply of heat to process operations or the dissipation of heat from the bearing and drive point.

In accordance with a feature of the present invention, the coils are provided with pole pieces which enable a smaller air gap and, thus, provide better efficiency than would be possible in their absence. Pole pieces, more particularly, permit accurate control over the induction process and thus enable the use of solenoid sizes and arrangements which would be impossible otherwise. According to another feature of the present invention, the main axes of the pole pieces point in a radial direction which has the advantage that the arrangement lies in its good magnetic contact and outweighs its disadvantage which lies in additional eddy currents occurring at the edges of the pole pieces. The pole pieces according to another feature are disposed in a stellar arrangement around the revolving member, with those of their sides which point away from the revolving member being interconnected by a shroud such that it is possible to symmetrically group almost any number of coils around the revolving member of the drive. In accordance with a further feature of the present invention, those sides of the pole pieces which face the revolving member are widened such that there remains but a small gap between adjacent pole pieces. Due to the resulting, more uniform distribution of induction in the air gap between the revolving member and the pole pieces, the magnetic energy required thereat can be less, and thereby results in an improvement in efficiency.

According to a feature of the present invention, each coil is arranged between each pair of pole pieces, where the windings of the coils wind around the shroud. While generally all types of winding known in electrical motor work may be used in the arrangement of those windings on the circumference of the stationary member which generate the electromagnetic rotating field, this arrangement provides a particular advantage in that windings around the shroud, while giving very satisfactory efficiency, provide for minimum overall height of the coil arrangement. In this arrangement, the number of windings varies from one pole piece to the next in accordance with a sine function. the simultaneous use of several staggered combinations of coils would also be possible. This ensures that the induction process is cosine in form and that interferences in the revolving member of the drive are a minimum.

In accordance with another feature of the present invention, the coils are combined into individual windings each enveloping 180°, where more particularly an arrangement of six individual windings spaced 60° apart is provided. In this arrangement, two diametrically opposite individual windings at a time are combinend into a pair of coils. Three pair of coils, while utilizing the space available for the coils, represent the most favorable arrangement still capable of generating a rotating field of constant amplitude and simultaneously permitting positional control of the rotary body. For drive purposes, the three pair of coils are energized with three currents 120° apart of the same amplitude. When positional control is needed, these currents are superimposed with control currents which additionally excite the individual coils and thus impose on the revolving member a radial force in addition to the rotating field.

In accordance with a further feature of the present invention, each coil exhibits separate connections for individual control. In this manner all coils can be controlled individually, but simultaneously have predetermined current portions to drive the revolving member. These current portions are superimposed to individual or all solenoids by control currents serving to correct deviations of the revolving member from the desired radial position, such as DC currents where the part is statically deflected as, say, a drooping shaft, fading currents after a deflection has successfully been rectified, or AC currents as for attenuating characteristic values of the revolving member or when traversing critical speeds. A particularly beneficial means of positional control may be to energize or excite two maximally closely adjacent coils through which control currents are passing of the same intensity but in opposite directions. This arrangement provides a maximum of accumulated radial force and a minimum of rotating interference field as a result of the control field being superimposed on the rotating field. Use can be made, however, also of several adjacent coils for the purpose should it be necessary to maximize the surface area of application of the actuating force perhaps to prevent deformation of a thin-walled tubular rotating part. In this case, it will be possible to simultaneously energize any number, for example, three coils with control currents. This arrangement more particularly prevents the risk of exciting natural vibrations in the case of tubular rotors as a result of inadvertently severe concentration of magnetic force. The last mentioned arrangement will provide an advantage also when it is intended that the resultant action of the magnetic actuating forces should not fall midway between two solenoids.

According to another feature of the present invention, the control means exhibits one control mode which generates, from the radial position of the rotary body as determined by the test system, the additional currents fed to the solenoids for the purpose of restoring the rotary body to its intended position, and an additional control mode which compensates for undesirable side effects of the requisite actuating force. The presence simultaneously of the rotating magnetic field for drive purposes and of the actuating field generated by the control currents produces, above and beyond the intended and needed actuating effect, a number of unavoidable interferences (such as elliptically revolving forces) which are counteracted from the start by the additional control mode. The countereffects necessarily result from the effective actuating force and the state of the rotating field at the moment and the control system may be adapted to the control requirements with the necessary accuracy in a manner known in the art.

According to a further feature of the present invention, the test or measuring system exhibits inductive sensors formed at least in part by the coils or parts of their windings as an addition to their normal drive and actuating functions. The advantage offered by this arrangement is not only that use is here made of existing parts already serving other functions for measuring the position of the rotary body or for measuring its distance from the individual sensor, but also that the measurement is made in exactly the plane in which the actuating effect acts on the revolving member. In this arrangement, the coils or parts thereof are energized by, apart from the control and drive currents, test currents of a frequency outside the range covered by the drive and control currents, so that the information provided by the test currents can be segregated from the drive and control processed by filtering, for example. The test currents may be small in amplitude, so that the magnetic forces they cause will have no appreciable effect on the revolving member. The test currents will permit conclusions to be made, after filtering, as to the inductivity at the moment and thus as to the air gap at the test point at that moment and the filtering and evaluating means associated with the test system may be provided in a manner known in the art.

In accordance with a further feature of the present invention, the current needed for energizing the test system and that for achieving the actuating force is identical. This eliminates the need for an entire current system, considering that the control function and the test function are both served by a single current system. While the test system invariably requires a test current, the control system may go without current. When symmetrically arranged combinations of coils are used for testing (conceivably spaced 120° apart), the effects of the respective equal test currents will cancel one another when the rotary body revolves centrally. When an actuating force is needed, the respective test current will be increased. As a test signal, use can be made of the imbalance of the ratios prevailing for each test point of the test voltage to the test current.

In accordance with another feature of the present invention, the sensors are arranged within the pole pieces such that if the pole pieces are disposed in, e.g., a stellar arrangement, the side of the pole piece facing the revolving member exhibits a circumferentially arranged recess accommodating a sensor, such as an inductive test loop. Except for the use of sensors not integral with the other solenoids, the advantages will generally be the same as previously described. It will be appreciated, however, that extensive decoupling such as this between the control and drive currents on the one hand and the test currents on the other will widely simplify and economize the filtering measures for this arrangement. This arrangement also provides a further advantage in that owing to the spatial extent of the solenoids, the result of the positional measurement will not be integrating, as is necessarily was before, but in that it is now possible to determine the exact distance of the point on the revolving member opposite the sensor, where the sensor is in turn not wider than a pole piece.

According to a further feature of the present invention, the revolving member is a magnetically hard material such that when the rotating fields are turned off, the drive will function as a generator and will yield electrical energy. A rotary body possessing a high moment of inertia about its spin axis and rapidly revolving at little loss owing to the action of the magnetic active bearing could be used, after the drive has been de-energized, as a store of energy to yield energy in the generator mode. This store of energy can be switched to accumulate electrical current, say, at low cost nighttime rates and yield current at daytime rates. The use of such storage units has been limited owing to the use of mechanical bearings. Exploitation is poor because a rotary body revolving in rigid mechanical bearings invariably rotates about its geometric centerline, not its centroidal axis, and departure of the centroidal axis from the centerline causes forces of deflection which in the form of bearing forces cause friction and consume energy. Active bearings however make it possible to have the rotary body revolve eccentrically with no great consumption of energy, and no wear will occur in the process. Also, in the generator mode the control means can take its operating current from the generator. A simple device can be employed to automatically engage a mechanical safety bearing when a certain speed is no longer maintained, which bearing will then sustain the rotaty body in its central position until it has come to rest.

In accordance with a further feature of the present invention, a reversing device automatically switches the current generated during the generator mode to the control means in the event of power failure. For switch-over, use could be made of, e.g., a relay device. Sensitive systems, such as rapidly spinning rotors, will not survive a power failure when active bearings are their only means of support. This is why active bearings are normally complemented with mechanical emergency bearings. However, a bearing arrangement according to the present invention will provide its own bearing current as long as the rotor is in sufficiently rapid rotation, so that it will not crash or need careful deceleration to stand still in the event of power failure or when the main supply is cut off for repair.

These and further objects, features and advantages of the present invention will become more obvious from the following description when taken in connection with the accompanying drawings which show, for purposes of illustration only, several embodiments in accordance with the present invention, and wherein FIG. 1 is a cross-sectional view of an electromagnetic drive arrangement in accordance with the present invention;

Figure 1:
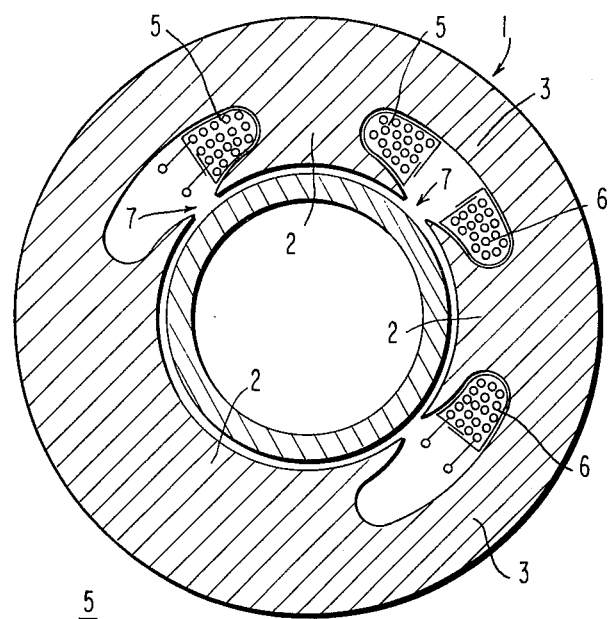

Referring now to the drawings wherein like reference numerals designate like parts throughout the several views, there is shown in FIG. 1 a cross-sectional view of the drive arrangement of the present ivention including a core 1 having three pole pieces 1 interconnected by shroud 3 and surrounding a rotating member 4. Two of the three pole pieces are surrounded by a coil 5, 6, respectively. For driving purposes, the coils are supplied with out-of-phase currents for controlling the positioning of the rotating member 4, additional currents are superimposed on the driving currents with the resultant actuating effect being exercised upon the revolving member. The pole piece 2 have a main axis extending in the radial direction and as shown in FIG. 1, have the end faces thereof adjacent the rotating member 4, widened with respect to other portions of the pole pieces such that a small gap 7 is provided between the widened portions of the adjacent pole pieces.

Figure 2:
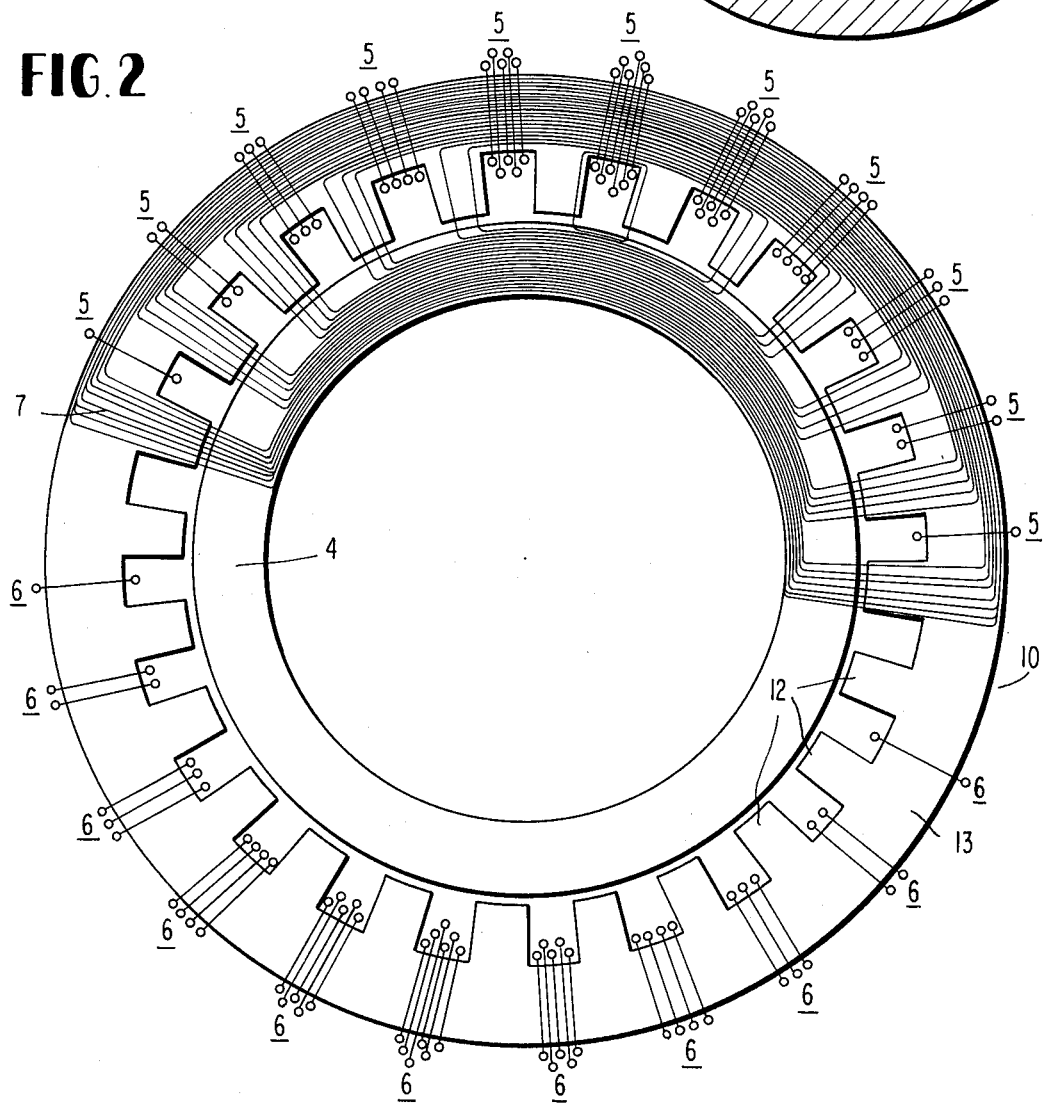
FIG. 2 is an end view illustrating pole pieces in a stellar arrangement.

FIG. 2 is an end view illustrating a core 10 having 24 pole pieces 12 interconnected by a shroud 13 and surrounding the revolving member 4. Two coils 5 and 6 are arranged on the core so as to each embrace 180° while the nubmer of windings varies from one pole piece to the next in accordance with a sine function. The lines of magnetic force 7 associated with the coil 5 are indicted by reference numeral 7 whereby coils 5 and 6 form a pair of coils on the core member. Due to the stellar arrangement of the pole pieces around the revolving member and the interconnection of the portions thereof facing away from the revolving member with the shroud 13, it is possible to symmetrically group almost any number of coils about the revolving member of the drive of the present invention.

Figure 3:
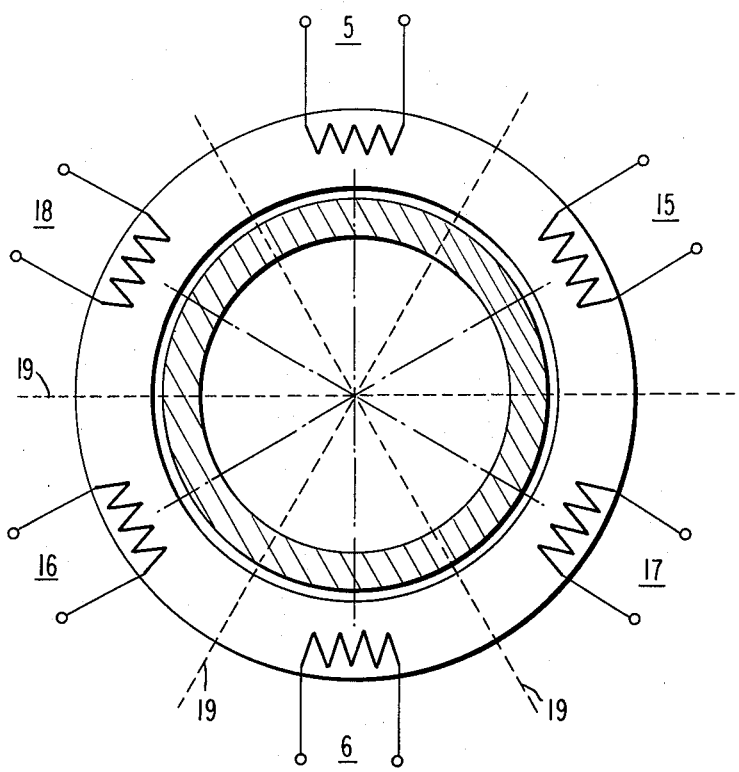
FIG. 3 is a schematic equivalent circuit diagram of the arrangement of FIG. 2.

FIG. 3 is a schematic equivalent circuit diagram of the arrangement of FIG. 2 wherein in addition to the pair of coils 5 and 6 and spaced 120° apart from such coils are two further pair of coils 15, 16 and 17, 18. Inasmuch as this is a schematic representation, it should be noted that each coil extends over 180°, which in the case of six coils as illustrated in FIG. 3, each coil overlaps the adjacent coil by 120°. The effective ranges of the various coils are confined from one another as illustrated by the dashed lines 19.

Figure 4:
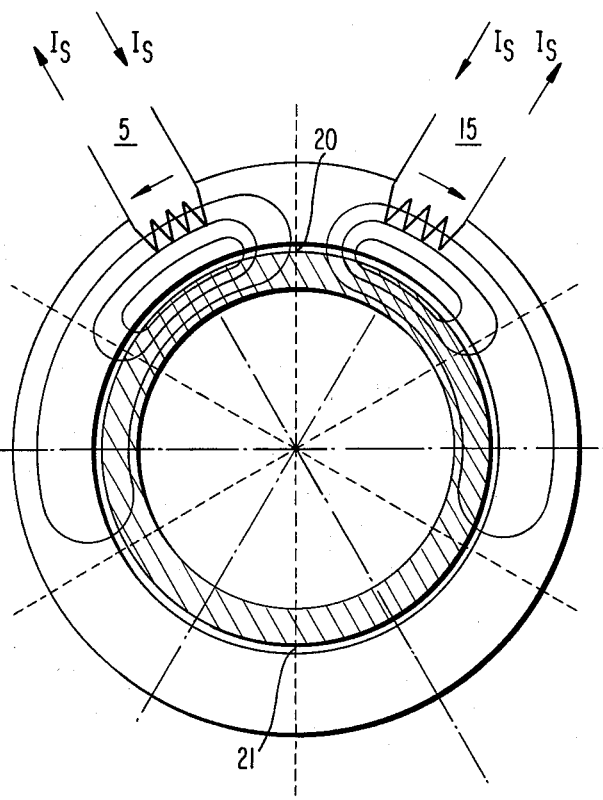
FIG. 4 is a schematic equivalent circuit diagram similar to FIG. 3 showing only the equivalent circuit diagram of two adjacent solenoids.

As shown in FIG. 4 which is a partial equivalent circuit diagram similar to FIG. 3 only the equivalent circuits of two adjacent coils 5 and 15, the two coils are energized with out-of-phase current which generate the rotating field for driving purposes and additionally with a same but opppositely control current $I_S$. The control current creates, at point 20, a locality of maximum intensity of the magnetic field, and, at an opposite point 21, a locality of minimum intensity of magnetic field. As such, there is provided a resultant actuating action along the dashed line passing through the points 20 and 21 which serves for controlling the position of the rotating member 4 as required. It is noted that in this representation, the rotating field for driving purposes and interaction between the two fields has been ignored. However, for driving purposes, the three pair of coils are energized with three currents 120° apart and of the same amplitude with the driving currents being superimposed with control currents which additionally excite the individual coils and thus impose on the revolving member a radial force in addition to the rotating field. Each coil preferably exhibits separate connections for individual control such that all the coils can be controlled individually while simultaneously having predetermined current portions for driving the revolving member with these current portions being superimposed in individual or all coils by control currents serving two correct deviations of the revolving member from the desired radial position.

Figure 5:
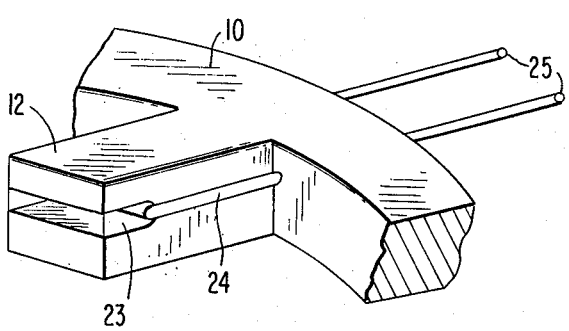
FIG. 5 illustrates a single pole piece of a core member in accordance with the present invention having a slot for accommodating an inductive test group therein.

In order to detect the radial position of the revolving member, inductive sensors may be formed at least in part by the coils or parts of such windings as an addition to their normal drive and actuating functions. In this manner, the coils or parts thereof are energized, apart from the control and driving currents, test currents of a frequency outside the range covered by the drive and control currents, so that information provided by the test currents can be separated from the drive and control processes for example by filtering and evaluating means. In accordance with the detection of the position of the revolving member, the control currents are generated. As shown in FIG. 5 which illustrates a single pole piece of the 24-pole core 10 of FIG. 2, there is provided at the end face or tip thereof a circumferentially disposed slot 23 accommodating an inductive test loop 24. The test loop 24 terminates in two connections 25 outside the 24-pole piece core 10. In this arrangement, the magnetic field lines of the control and drive process in the material of the pole piece are orthogonal to the normals of the surface elements of the test loop 13. By utilizing a test loop or sensor 13, the necessity for extensive decoupling such as between the control and drive currents and the test currents is simplified and it is possible to determine the exact distance of the point on the revolving member opposite the sensor or test loop 24.

Figure 6:
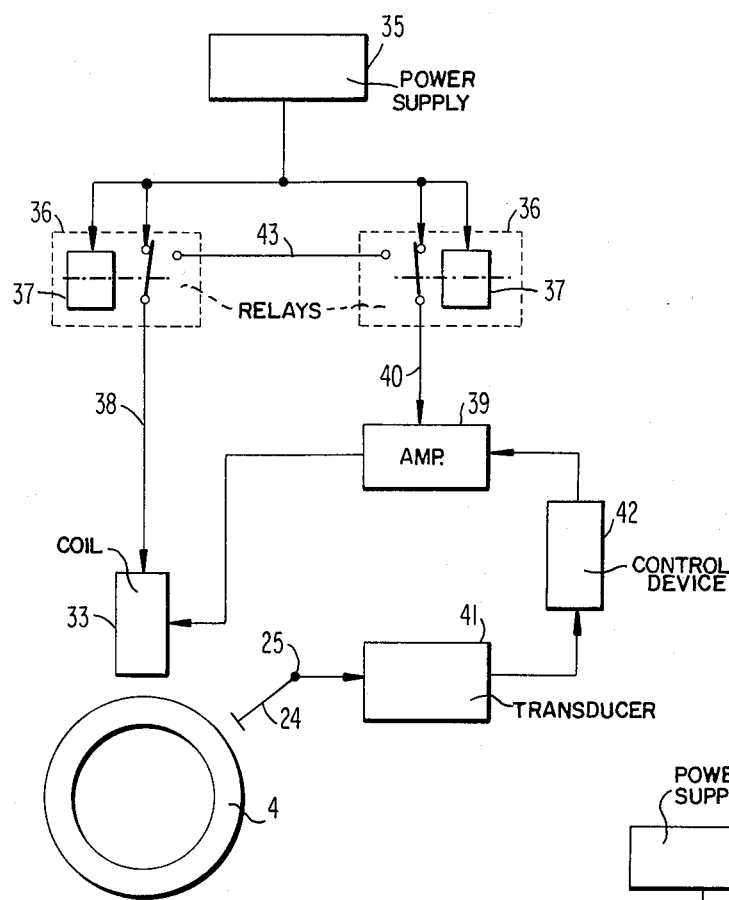
FIG. 6 is a schematic arrangement of the drive, control and testing system for an electromagnetic drive in accordance with the present invention wherein power is supplied from the mains.

As shown in FIG. 6 which is a block diagram of an arrangement in accordance with the present invention, the rotating member 4 is surrounded by coils 33 and test loops or sensors 24, only one of each being illustrated, disposed in a core (not shown). A power supply, for example the mains supply 35 provides power via relays 36 to the appropriate portions of the system of the present invention. In particular, power is fed from the power supply 35 to energizing coils 37 of the relays 36 so as to maintain the contacts thereof in the position shown for feeding power to the coil 33 via the connection line 38. Additionally, power is fed to a conventional type of amplifier 39 of the control system via a connection line 40. The signals sent by the sensor 24 are provided via the output connections 25 to a conventional type of measuring and sensing transducer device 41 providing an output indicative of the radial position of the rotating member 4 to a conventional type of control device 42 and the amplifier 39 which supplies current of the appropriate value to the coil 33 as a superimposed current on the driving current for effecting radial position of the rotating member 4.

Figure 7:
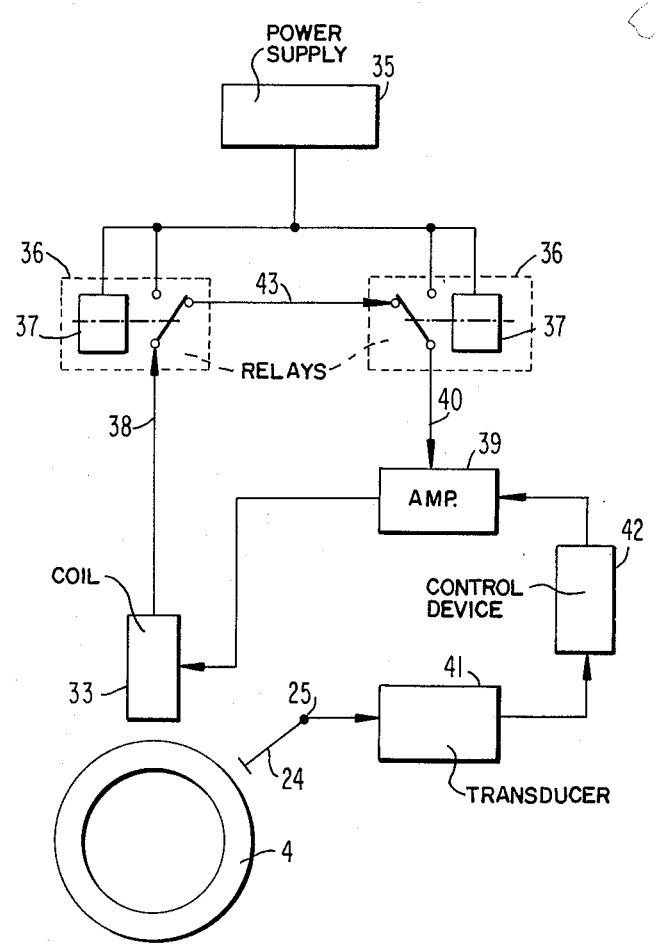
FIG. 7 is a schematic diagram of the arrangement similar to FIG. 6 illustrating the connections in the generating mode of the electromagnetic drive.

The rotating member is preferably formed of a magnetically hard material such that when the rotating or driving fields are turned off, the electromagnetic drive functions as a generator and will yield electrical energy. Thus, a rotary body such as the rotating member 4 possessing a high moment of inertia about its spin axis and rapidly revolving a little loss owing to the action of the magnetic active bearing may be utilized after the electromagnetic drive has been de-energized in a generating mode. As shown in FIG. 7, in the case of, for example, a failure of the power supply 35, the coils 37 of the relays 36 are de-energized such that the contacts of the relays move to the position shown providing an interconnecting path between the connections 38 and 40 via the connection line 43. In this manner, power generated in the coils 33 by the movement of the rotor or rotating member 4 is directly supplied to the amplifier 39 for energizing the control system which again may be utilized to feed current to the coil 33 for positioning of the rotating member 4. In this manner, positioning of the rotor can be maintained for increasing the length of rotation in the generating mode.

Obviously, many modifications and variations of the present invention are possible in the light of the above teachings. It should therefore be understood that within the scope of the appended claims, the invention may be practiced otherwise than as specifically described.

We claim:

1. An electromagnetic drive assembly comprising a stationary member and a rotatable member of a magnetizable material, one of said stationary and rotatable members being disposed within the other of said stationary and rotatable members, said stationary member being provided with at least two coil means for simultaneously producing a rotating magnetic field for driving said rotatable member and a nonrotating magnetic field for positioning said rotatable member relative to said stationary member, each of said coil means being supplied with a first current therethrough for producing the rotating magnetic field and a second current through at least a portion thereof supperimposed on the first current for producing the nonrotating magnetic field, sensing means for sensing the spacing between said stationary and rotatable members and providing an output indicative thereof, and control means for varying the second current and thereby the nonrotating field for maintaining a predetermined spacing between said stationary and rotatable members.

2. Electromagnetic drive assembly according to claim 1, further comprising pole pieces for said coil means.

3. Electromagnetic drive assembly according to claim 2, wherein each of said pole pieces has a main axis extending in a radial direction.

4. Electromagnetic drive assembly to claim 3, wherein said pole pieces are disposed in a stellar arrangement around said rotatable member, and a shroud interconnects the portions of the pole pieces facing away from said rotatable member.

5. Electromagnetic drive assembly according to claim 4, wherein said stationary member includes said pole pieces and said interconnecting shroud thereby defining a core member.

6. Electromagnetic drive assembly according to claim 4, wherein the end faces of the pole pieces facing said rotatable member are widened with respect to other portions of said pole pieces such that a small air gap is provided between two adjacent pole pieces at the end faces thereof.

7. Electromagnetic drive assembly according to claim 4, wherein said coil means are each arranged between two pole pieces and said coil means having the windings thereof wound around said shroud.

8. Electromagnetic drive assembly according to claim 6, wherein said coil means are each arranged between two pole pieces and said coil means have the windings thereof wound around said shroud.

9. Electromagnetic drive assembly according to claim 7, wherein said coil means are provided with individual windings extending over 180° of said stationary member.

10. Electromagnetic drive assembly according to claim 9, wherein said coil means comprise six individual windings spaced 60° apart.

11. Electromagnetic drive assembly according to claim 9, wherein each of said coil means is provided with separate connection means for individual energization thereof.

12. Electromagnetic drive assembly according to claim 11, wherein said control means is provided with at least one control mode for generating current for energizing said coil means to restore said rotatable member to a predetermined position in response to the output of said sensing means.

13. Electromagnetic drive assembly according to claim 12, wherein said control means is provided with another control mode for generating compensating signals for undesirable side effects of the actuating force.

14. Electromagnetic drive assembly to claim 12, wherein said sensing means includes inductive sensors formed at least in part by said coil means in addition to the driving and actuating functions provided by said coil means.

15. Electromagnetic drive assembly according to claim 14, wherein said inductive sensors are formed at least in part by portions of the winding of said coil means.

16. Electromagnetic drive assembly according to claim 15, wherein the current to energize the sensing means and that to provide the actuating force are identical.

17. Electromagnetic drive assembly according to claim 12, wherein said sensing means includes sensors arranged within said pole pieces.

18. Electromagnetic drive assembly according to claim 17, wherein said pole pieces are provided with a circumferentially extending recess in the end face thereof facing said rotatable member and said sensors include an inductive test loop disposed within the slot and terminating in connection means outwardly of said stationary member.

19. Electromagnetic drive assembly according to claim 14, wherein said rotatable member is formed of a magnetically hard material.

20. Electromagnetic drive assembly according to claim 19, wherein said coil means is responsive to continued rotation of said rotatable member without said coil means being energized for driving said rotatable member for operating in a generating mode to generate power in response to the rotation of said rotatable member.

21. Electromagnetic drive assembly according to claim 20, further comprising switching means for establishing a connection path from a power supply means to said coil means and to said control means, said switching means being responsive to failure of said power supply means for establishing a connection path between said coil means and said control means for supplying power generated in the generating mode of said coil means to said control means for purposes of positional control.

22. Electromagnetic drive assembly according to claim 1, wherein each of said coil means is provided with separate connection means for individual energization thereof.

23. Electromagnetic drive assembly according to claim 1, wherein said control means is provided with at least one control mode for generating current for energizing said soil means to restore said rotatable member to a predetermined position in response to the output of said sensing means.

24. Electromagnetic drive assembly according to claim 23, wherein said control means is provided with another control mode for generating compensating signals for undesirable side effects of the actuating force.

25. Electromagnetic drive assembly according to claim 23, wherein said sensing means includes inductive sensors formed at least in part by said coil means in addition to the driving and actuating functions provided by said coil means.

26. Electromagnetic drive assembly according to claim 25, wherein said inductive sensors are formed at least in part by portions of the windings of said coil means.

27. Electromagnetic drive assembly to claim 2, wherein said sensing means includes sensors arranged within said pole pieces.

28. Electromagnetic drive assembly according to claim 27, wherein said pole pieces are provided with a circumferentially extending recess in the end face thereof facing said rotatable member and said sensors include an inductive test loop disposed within the slot and terminating in connection means outwardly of said stationary member.

29. Electromagnetic drive assembly according to claim 1, wherein said rotatable member is formed of a magnetically hard material.

30. Electromagnetic drive assembly according to claim 29, wherein said coil means is responsive to continued rotation of said rotatable member without said coil means being energized for driving said rotatable member for operating in a generating mode to generate power in response to the rotation of said rotatable member.

31. Electromagnetic drive assembly control according to claim 30, further comprising switching means for establishing a connection path from a power supply means to said coil means and to said control means, said switching means being responsive to failure of said power supply means for establishing a connection path between said coil means and said control means for supplying power generated in the generating mode of said coil means to said control means for purposes of positional control.

32. Electromagnetic drive assembly according to claim 31, further comprising pole pieces for said coil means.

33. Electromagnetic drive assembly to claim 32, wherein said sensing means includes sensors arranged within said pole pieces.

34. Electromagnetic drive assembly according to claim 33, wherein said pole pieces are provided with a circumferentially extending recess in the end face thereof facing said rotatable member and said sensors include and inductive test loop disposed within the slot and terminating in connection means outwardly of said stationary member.

35. Electromagnetic drive assembly according to claim 26, wherein said stationary member is an annular member and said coil means are radially wound about said annular member.

* * * * *